J. G. ROUNTREE.
FARM TRACTOR.
APPLICATION FILED MAY 8, 1918.
1,301,976.
Patented Apr. 29, 1919.
2 SHEETS—SHEET 1.
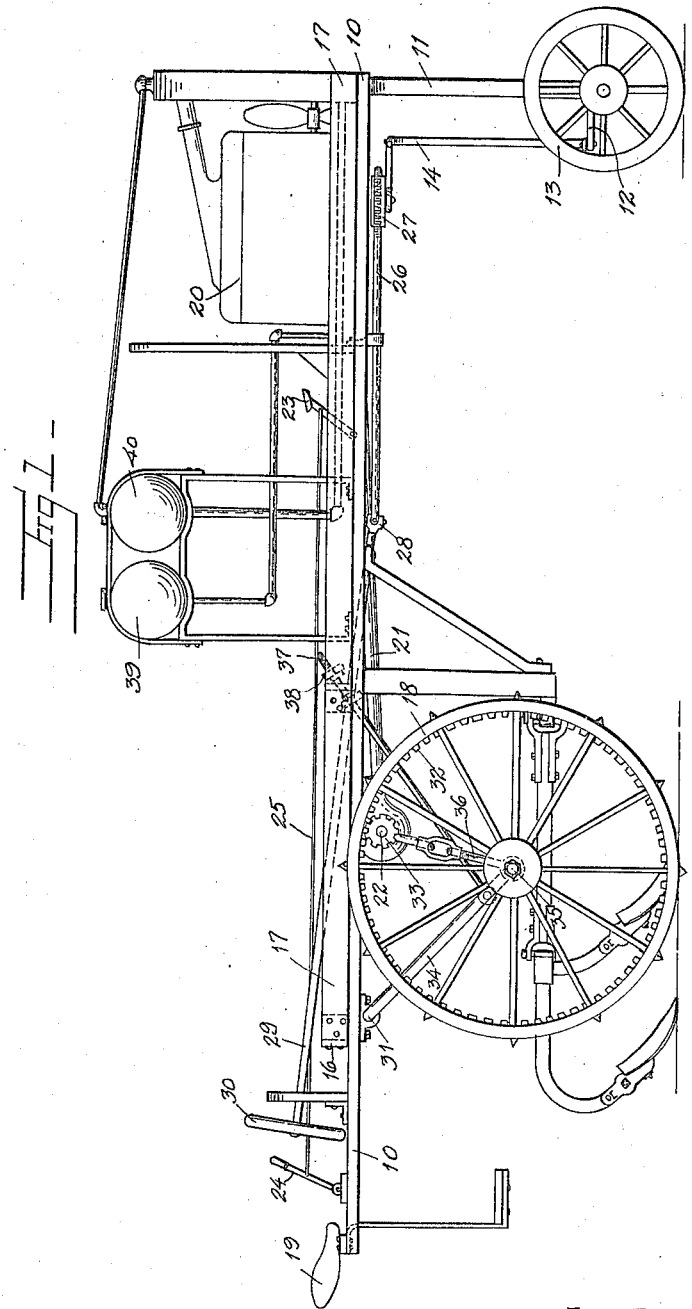
Inventor
J. G. Rountree
By Watson E. Coleman
Attorney

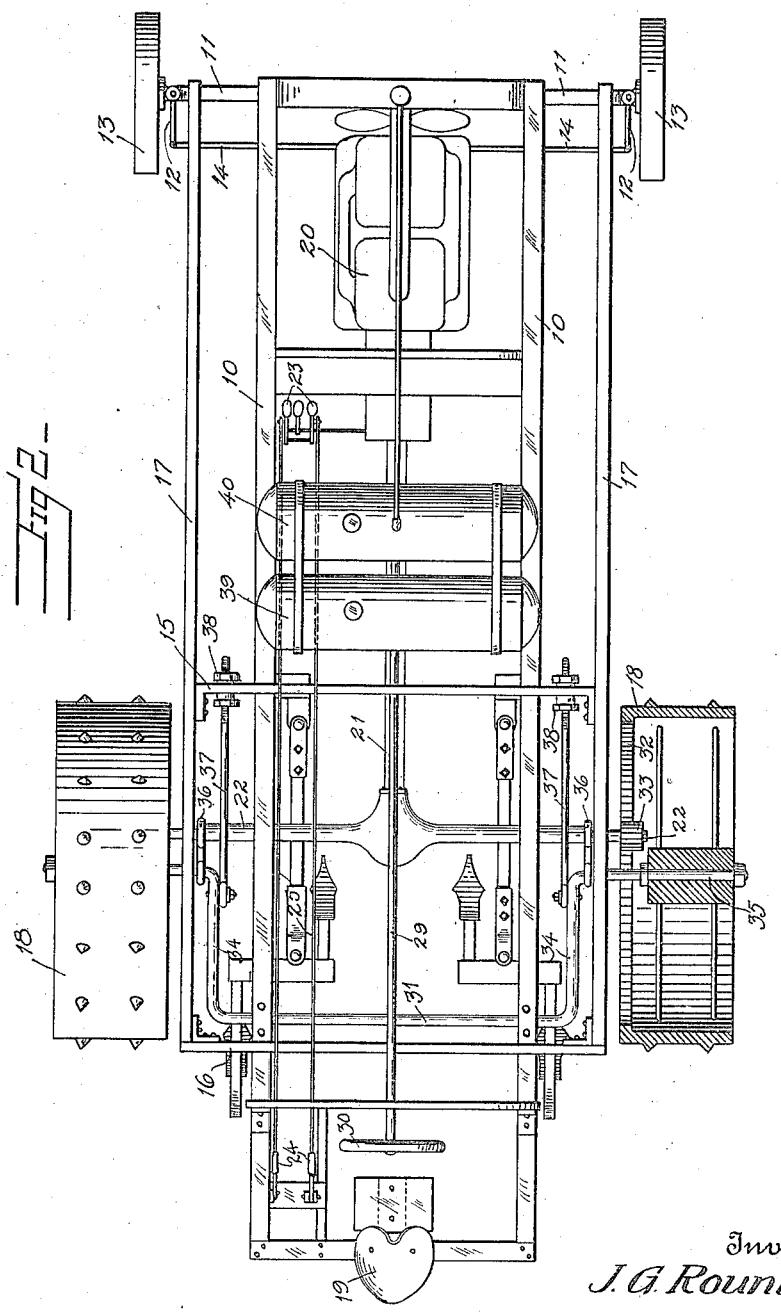

UNITED STATES PATENT OFFICE.

JOSEPH G. ROUNTREE, OF BEEVILLE, TEXAS.

FARM-TRACTOR.

1,301,976.   Specification of Letters Patent.   Patented Apr. 29, 1919.

Application filed May 8, 1918. Serial No. 233,285.

*To all whom it may concern:*

Be it known that I, JOSEPH G. ROUNTREE, a citizen of the United States, residing at Beeville, in the county of Bee and State of Texas, have invented certain new and useful Improvements in Farm-Tractors, of which the following is a specification, reference being had to the accompanying drawings.

This invention relates to tractors, and particularly to light farm tractors designed for plowing, cultivating or other like work.

The general object of the invention is to provide a tractor which is very simple as regards its construction, which is relatively light, and which is particularly adapted for supporting plows or cultivators.

A further object is to so construct the tractor that it will be high enough to permit the attachment of cultivators, plows or other ground working implements to its rear end behind the traction wheels.

A further object is to provide means whereby the height of the rear end of the tractor may be adjusted or regulated to thereby control the depth to which the ground working implements will work.

A further object is to provide a tractor of this character with a seat for the operator disposed at the rear end of the machine directly over the earth working implements, the engine being disposed at the forward end of the tractor, and provide controlling levers at the rear end of the tractor operatively connected to the controlling pedals of the engine.

Other objects will appear in the course of the following description.

My invention is illustrated in the accompanying drawings, wherein:

Figure 1 is a side elevation of a tractor constructed in accordance with my invention; and Fig. 2 is a top plan view of the tractor.

Referring to these drawings, it will be seen that the main frame of the machine comprises the longitudinally extending beams 10, spaced from each other and supported at their forward ends by means of the transversely extending arched axle 11, to which the knuckles 12 are pivotally connected, these knuckles carrying the steering wheels 13. The knuckles are connected to each other in the usual manner, by means of the transversely extending connecting rod 14. The rear end of the frame of the beams 10 is supported by the transversely extending beams 15 and 16. The arched axle 11 and the beams 15 and 16 extend out beyond the beams 10 and connecting the axle 11 with the beams 16 and 17 are the laterally disposed longitudinally extending bracing beams 17. The rear end of the frame is supported upon traction wheels 18, in a manner which will be later described.

The rear end of the main frame supports the seat 19 and carried upon the forward end of the main frame is the internal combustion engine 20, which may be of any resired type, from which extends the driving shaft 21, this shaft being connected to a transverse driving shaft 22 by means of the usual differential. This rear driving shaft and differential may be housed, if desired.

The engine 20 may be of any suitable character, but I design to use a Ford engine, and the usual transmission mechanism thereof. This form of engine is provided with the levers 23 and in order to permit these pedals to be operated from the rear of the machine, I provide operating levers 24 disposed adjacent the driver's seat and operatively connected by rods 25 to the pedals 23. For the purpose of steering the machine, I operatively engage the connecting rod 14 in the usual manner to the steering shaft 26 and to this end I preferably screw-thread the steering shaft to engage with the screw-treaded nut 27 which in turn is engaged with the connecting rod. The rear end of this shaft 26 is provided with a universal joint 28 by which it is engaged with a steering shaft 29 extending into a position adjacent the seat and provided with the steering wheel 30.

The rear axle 31 carries, as before stated, the traction wheels 18 and also carries, as for instance attached to the traction wheels, the internal gears 32. These internal gears are engaged by pinions 33 mounted upon the driving shaft 22. The rear axle 31 is a cranked axle having arms 34 which extend downward and forward, the forward ends of these arms 34 being provided with the spindles 35 upon which the traction wheels 18 are mounted. The cranked axle 31 is mounted on the frame for oscillation in a vertical plane and mounted upon the cranked portions of the rear axle are the braces 36 which extend to and support bearings for the driving shaft 22. For the purpose of vertically adjusting the arms 34 of the rear axle, I provide adjusting rods 37 which are pivotally connected to the rear axle and which extend upward and forward and pass through the tranverse beam 15 and are provided with the nuts 38. By rotating these nuts in one direction or the other, the traction wheels 18 and the driving shaft 22 may be raised or lowered with relation to the main frame. The object of this adjustment is to allow for placing different sized drive pinions on the differential shaft. The adjusting brace 37 is very necessary for this purpose as without this brace there would be too much spring in the frame and there would be a liability of the gears disengaging. Different sized drive pinions are to permit different speeds. The plows and cultivators may be of any suitable character and are set under the axle 34 and fastened to the frames 10 and 17 in any desired manner.

It is to be noted that the main frame is supported at a relatively great elevation above the ground so as to provide plenty of room beneath the rear end of the main frame for the attachment of cultivators, plows or other ground working implements, and further these ground working implements are disposed immediately beneath the seat 19 so as to be under the constant observation of the operator, to thereby permit the operator to control the machine so that the cultivators will work between the rows. Means may, of course, be provided on the main frame for raising or lowering the cultivators or plows. The main frame supports an auxiliary frame upon which the gasolene tank 39 and the water tank 40 are mounted, the water tank being connected to the radiator of the engine while the gasolene tank is connected to the carbureter in the usual manner.

While I have illustrated a form of my invention which I believe to be thoroughly practical and which will fulfil the requirements of a light tractor to be used for cultivation, yet I do not wish to limit myself to the details of construction as it is obvious that these may be changed in many respects without departing from the spirit of the invention.

Having described my invention, what I claim is:

1. A tractor of the character described comprising a main frame, steering wheels supporting the forward end of the frame, an engine mounted upon the forward end of the frame, a crank shaft supporting the rear end of the frame and having traction wheels thereon, internal gears connected to said traction wheels, a transversely extending driving shaft operatively connected to the engine, means for supporting the transverse driving shaft from the cranked axle, and means for raising and lowering the cranked axle relative to the frame.

2. A tractor of the character described comprising a main frame, steering wheels supporting the forward end of the frame, an engine mounted upon the forward end of the frame, a cranked axle mounted upon the rear end of the frame for oscillation in a vertical plane, brace rods connected to the cranked portions of the axle and extending upward to the main frame, a member through which the brace rods pass, nuts having screw-threaded engagement with the brace rods on each side of said member whereby to adjust the cranked axle, traction wheels mounted upon the cranked axle and carrying internal gears, a transverse driving shaft operatively driven from the engine and having pinions engaging the internal gears, and supporting members mounted upon the cranked axle and engaging and supporting the driving shaft.

3. A tractor of the character described comprising a main frame, steering wheels supporting the forward end of the frame, an engine mounted upon the forward end of the frame, a cranked axle mounted upon the rear end of the frame for oscillation in a vertical plane, brace rods connected to the cranked portions of the axle and extending upward to the main frame, a member through which the brace rods pass, nuts having screw-threaded engagement with the brace rods on each side of said member whereby to adjust the cranked axle, traction wheels mounted upon the cranked axle and carrying internal gears, a transverse driving shaft operatively driven from the engine and having pinions engaging the internal gears, and supporting members mounted upon the cranked axle and engaging and supporting the driving shaft, controlling members mounted on the engine, a seat at the rear end of the frame, controlling levers operatively connected to said controlling members and disposed at the rear end of the frame, and steering mechanism including a steering shaft having a handle disposed at the rear end of the frame.

In testimony whereof I hereunto affix my signature in the presence of two witnesses.

JOSEPH G. ROUNTREE.

Witnesses:
J. M. BORDE,
M. A. MILLER.